Dec. 13, 1966 C. F. CHONG 3,292,162

DATA STORAGE READ OUT NETWORK

Filed Aug. 28, 1962

INVENTOR
CARLOS F. CHONG

BY William E. Cleaver

ATTORNEY

United States Patent Office 3,292,162

Patented Dec. 13, 1966

3,292,162

DATA STORAGE READ OUT NETWORK

Carlos F. Chong, Philadelphia, Pa., assignor to Sperry Rand Corporation, New York, N.Y.

Filed Aug. 28, 1962, Ser. No. 220,005

5 Claims. (Cl. 340—174)

This invention relates to sense lines to be used with magnetic elements which store data and more particularly to a transmission line network arrangement for sensing the data stored in said magnetic elements.

Transmission lines have been employed heretofore as a means for sensing signals from magnetic, data-storage elements such as magnetic cores or thin film deposits, etc. Certain advantages can be obtained when transmission lines are employed for sensing signals from magnetic, data-storage elements; for instance, a transmission line is sensitive to the weak signals and the sensitivity can be improved since such a line can be arranged to minimize the effects of the noise signals.

By way of example, consider a magnetic element memory that has sixteen thousand words and has a sense line for each plane thereof. Each sense wire would be coupled to sixteen thousand elements in its respective plane. If we further consider that the elements might be packed at approximately some twenty elements to the inch, a sense line for a particular plane would be approximately 65 to 70 feet long.

If a signal read-out were effected with such a sense line, in some cases it would take approximately 135 nanoseconds to be transmitted to a sense amplifier. Such a relatively long period of time severely hampers designing a system wherein there is needed a 300 nanosecond cycle period.

In the present invention, there are a number of transmission lines, called stubs, associated with each plane. When a particular magnetic element is selected for a read-out, the resulting generated signal need only travel the distance of the stub before being received by the sense amplifier, and the time for the excursion along the stub is directly proportional to the fraction of the full sense line that the stub represents. In other words, if there are eight stubs associated with one plane, the time to travel the length of the stub would be one-eighth of the time necessary to travel a sense line of the prior art which might be associated with the whole plane.

Accordingly it is an object of the present invention to provide an improved circuit arrangement for sensing signals generated by magnetic, data-storage elements.

It is a further object of the present invention to provide a circuit arrangement, for sensing signals generated by a relatively large number of magnetic data storage elements, which requires only a single read-out amplifier and at the same time provides a relatively fast read-out.

In accordance with a feature of the present invention there is provided a plurality of transmission line stubs each having substantially the same characteristic, $Z_0$.

In accordance with another feature of the present invention said plurality of transmission line stubs are arranged in $n+1$ groups. In each of said groups there are $m$ transmission line stubs which are connected serially, while the groups are connected, relative to one another, in parallel.

In accordance with yet another feature, this last-described series-parallel arrangement is connected in parallel with a load means whose impedance is equal to $m/n+1$ multiplied by said characteristic impedance, $Z_0$.

The above-mentioned and other features and objects of this invention will become more apparent by reference to the following description taken in conjunction with the accompanying drawings wherein.

In accordance with transmission line theory, if a signal is induced on the line there will be an energy wave set up which will travel down the line to the end thereof and reflect back up the line, provided the line is not terminated in its characteristic impedance. The energy wave which travels down the transmission lines does so with virtually no loss, and therefore a transmission line is of particular value when used to sense signals generated by magnetic, data-storage elements, since such signals are usually relatively weak. Further, transmission lines can be arranged as described in U.S. patent application No. 149,275, entitled "Magnetic Element Read-Out," by George Guttroff, filed November 1, 1961, to provide means for minimizing or attenuating noise signals which may be present on the line. Since the noise signals may be minimized, a transmission line makes it possible to more readily detect a weak signal generated by a magnetic data storage element.

As was mentioned earlier a transmission lines does have an inherent signal delay which has been compensated for by employing relatively short transmission line stubs each having an associated read-out amplifier. Each transmission line stub reads a certain number of elements, but the signal is delayed for only a short period of time since the stubs have a relative short length. In order to overcome the signal delay of a long transmission line but not require a plurality of amplifiers, the present invention provides a plurality of short transmission line stubs each having substantially the same characteristic impedance. The stubs are arranged in a series-parallel network and terminated in a load (whose value is determined by the common characteristic impedance of the stubs), which will be described in detail hereinafter.

The signal which is generated by any one of the short transmission line stubs is delayed for a relatively short period of time until the energy wave reaches the end of the stub, whereat this energy wave or signal sees a series-parallel circuit having a relatively small series ohmic impedance and a relatively small parallel ohmic impedance. The present arrangement results in having the power of the output signal somewhat diminished by the presence of the ohmic impedances, but does enable the network to operate with only one read-out amplifier.

Figure 1:
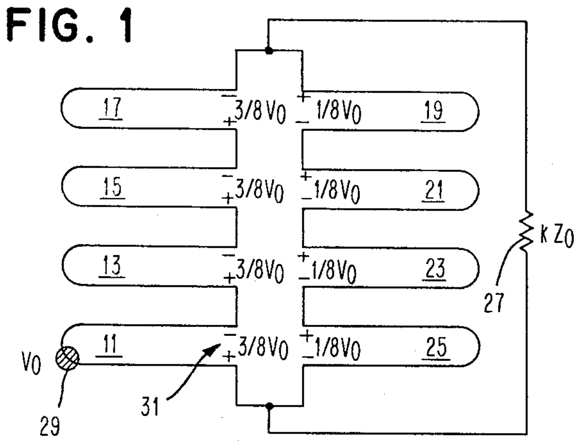
FIGURE 1 is a schematic of the present circuit in a simple form.

Consider the general case for FIGURE 1 which shows a plurality of transmission line stubs (odd numbered 11 through 25) connected in series-parallel arrangement. Each of the transmission line stubs has a characteristic impedance $Z_0$ and the entire arrangement is terminated in a load 27 which is equal to $kZ_0$. The factor $k$ is equal to $m/1+n$ where $m$ equals the number of transmission line stubs connected in series to form a group and $n$ is one less than the total number of parallel connected groups of stubs in the network.

Assume that the spot 29 is a thin film deposit which has generated or induced a signal $V_0$ on the transmission line stub 11. It can be shown that the location for the induced voltage makes no difference in the analysis of the circuit. As the energy wave (signal) induced by the element 29 travels down the transmission line stub 11, it is delayed for a relatively short period of time, $t$. At time $t$ it arrives at the near end 31 of the transmission line stub 11. A voltage value greater than the induced signal $V_0$ is present at the near end 31 (assuming the stub 11 is not terminated in an impedance having a value equal to or less than its characteristic impedance) because of the addition of the incident and the reflected waves. At time $t$ after the leading edge of $V_0$ ($V_0$ being assumed to be a step voltage) the equivalent circuit shown in FIGURE 2 can be obtained.

Figure 2:
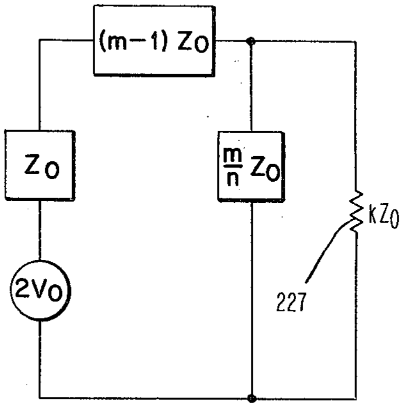
FIGURE 2 is a schematic of the equivalent circuit of FIGURE 1.

Consider the general case for the equivalent circuit of FIGURE 1 shown in FIGURE 2 which is in effect at time $t$. The signal $2V_0$ which is shown generated (in FIGURE 2) is the open end voltage on a transmission line when there is no load and results from the addition of the incident and reflected waves under no load conditions. In the actual circuit shown in FIGURE 1, the signal $2V_0$ could not be measured but in the equivalent circuit analysis it is properly chosen as the voltage of the generator. The signal $2V_0$ sees a series impedance of $Z_0$ (for line 11) plus $(m-1)$ $Z_0$, as well as a parallel impedance made up with one leg equal to $$\frac{m}{n}Z_0$$

and the other leg equal to $kZ_0$. If the equivalent circuit is analyzed further, it can be found that $V_{out}$ equals $$2V_0\left(\frac{q}{m+q}\right)$$

at time $t$.

Another interesting aspect of the present invention is the relationship of the energy waves on the various transmission line stubs. For instance, the voltage output at the near end 31 of stub 11 (under load conditions) is:

$$V_{11}=2V_0\left(\frac{m-1+q}{m+q}\right) \quad (1)$$

where $q$ equals the coefficient of the parallel circuit impedance and is equal to $m/1+2n$.

The incident voltage on each of the stubs 13, 15 and 17 is equal to $V_{out}-V_{11}/m-1$ or:

$$V_{13(15,17)}=2V_0\left(\frac{\frac{q}{m+q}-\frac{m-1+q}{m+q}}{m-1}\right)=\left(\frac{-2V_0}{m+q}\right) \quad (2)$$

Further, the incident voltage on any one of the transmission line stubs 19, 21, 23, and 25 is equal to:

$$V_{19(21,23,25)}=\left(\frac{q}{m(m+q)}\right)2V_0 \quad (3)$$

Finally the reflected wave on transmission line stub 11 is equal to the total voltage ($V_{11}$) minus the incident voltage $V_0$:

$$V_{11\ \mathrm{reflected}}=V_0\left(\frac{m+q-2}{m+q}\right) \quad (4)$$

The incident voltage on transmission line stubs 13, 15, and 17 and on transmission line stubs 19, 21, 23, and 25 as well as the reflected voltage on transmission line stub 11 each travel down their respective lines and are completely reflected with a change in polarity. At times $3t$, $5t$, $7t$, etc. each of these voltages appears at the near end, or the center end, of its respective stub. The load 27 is assured of being unaffected by the reflections, since when these last mentioned voltages are added together the voltage developed across the load (at time $3t$) is equal to 0:

$$V_{11\ \mathrm{reflected}}+mnV_{19}+(m-1)V_{13}=0 \quad (5)$$

It can be shown further that at time $5t$, $7t$, etc. the reflected voltages of the stubs would also add up to zero. It follows then that even though the reflected waves continue to traverse back and forth over the transmission line stubs, on each occasion when they simultaneously arrive at the center of the network the voltages cancel each other out so that there is no resultant voltage developed across the load. When the input signal is terminated, the negative signals generated on the lines cancel out the reflecting energy waves throughout the network.

Consider new FIGURE 1 with the specific values of the circuit elements shown therein. In FIGURE 1, $m$ will be equal to 4, $n$ is equal to 1, $k$ is equal to 2, and $q$ is equal to $\frac{4}{3}$. If the values for $m$ and $n$ are substituted in the equivalent circuit, it follows that the signal sees $4Z_0$ as a series impedace and $\frac{4}{3}Z_0$ as a parallel impedance in series with the $4Z_0$. Further if the values from FIGURE 1 are substituted in Equation 1 we find that the $V_{11}$ equals $\frac{13}{8}V_0$. The value $\frac{13}{8}$ is a measurable voltage and can be found at the near end 31 of stub 11 (under load conditions shown in FIGURE 1). This measurable voltage $\frac{13}{8}V_0$ includes both the incident wave and the reflected wave and will be referred to hereinafter as the total voltage or the initiating voltage. If the values from FIGURE 1 are substituted in Equation 2 it becomes apparent that the the total voltage across the stubs 13, 15, and 17 is equal to $-\frac{9}{8}V_0$ which when added to the initiating voltage $\frac{13}{8}V_0$ leaves $\frac{4}{8}V_0$ or $V_0/2$ across the load. Further, if the values from FIGURE 1 are substituted in Equation 3, the voltage drop across each of the transmission line stubs 19, 21, 23, and 25 is equal to $\frac{1}{8}V_0$. If the values from FIGURE 1 are substituted in Equation 4 we find that $V_{11\ \mathrm{reflected}}$ equals $\frac{5}{8}V_0$.

Finally if the above voltage values for FIGURE 1 are substituted in the Equation 5:

$$\tfrac{5}{8}V_0+(4\times 1)\tfrac{1}{8}V_0+(4-1)(-\tfrac{3}{8}V_0)=0$$

$$\tfrac{5}{8}V_0+\tfrac{4}{8}V_0-\tfrac{9}{8}V_0=0$$

Figure 4:
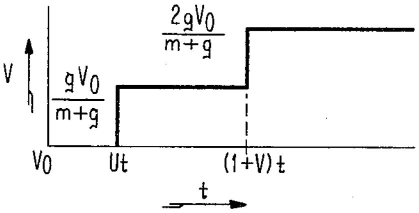
FIGURE 4 is a graphic display of the load voltage under conditions shown in FIGURE 3.
Figure 3:
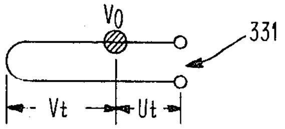
FIGURE 3 is a schematic of a transmission line stub associated with a signal generator located along the line toward the center end.

The signal developed across the load 27 at time $t$ is equal to $V_0/2$ for the configuration shown in FIGURE 1. In effect, the signal is delayed for a minimum time of $t$. If on the other hand the signal is generated at a location other than at the closed end of the transmission line, as shown in FIGURE 3, it will act in a similar fashion to $V_0$, just described. For example, in FIGURE 3, assume that the magnetic element is located $Ut$ from the open end and $Vt$ from the closed end. When the signal $V_0$ is generated, one-half of the signal ($V_0/2$) travels toward the center end 331 and the other half ($V_0/2$) travels towards the closed end. After $Ut$ time, the signal $V_0/2$ will appear at the center end 331 and act in the same fashion as $V_0$ described above. In other words $V_0/2$ will be the incident voltage. At $(1+V)t$ the $V_0/2$ signal which travels toward the closed end (having been reflected) will appear at the center end 331 and will also act as did signal $V_0$ described earlier. The load will experience two step signals and the second signal added to the first will provide an output of $V_0/2$ for the configuration shown in FIGURE 1. The step signal output can be seen from the graphic display of FIGURE 4. It should be noted that it does not make any difference at what location along the transmission line the magnetic element, which generates a signal, is located.

Figure 5:
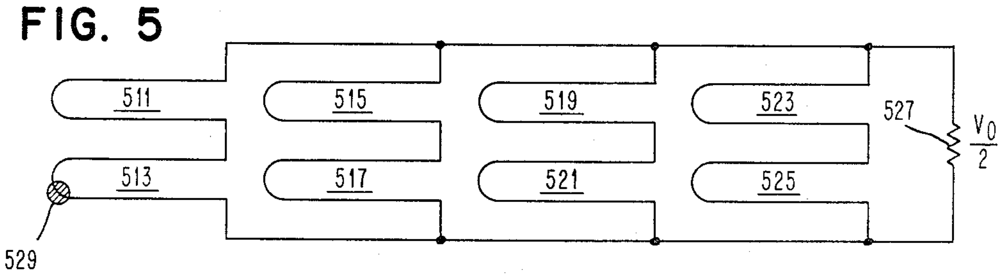
FIGURE 5 is a schematic of a second embodiment of the present circuit.
Figure 6:
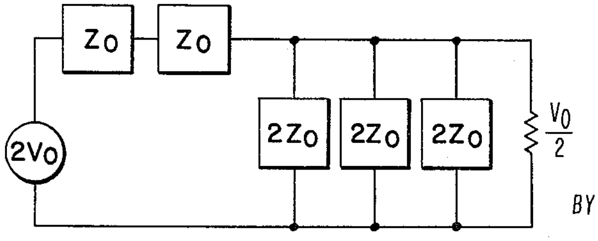
FIGURE 6 is a schematic of the equivalent circuit of FIGURE 5.

FIGURE 5 shows a second embodiment of the present invention. In FIGURE 5 there are shown eight transmission line stubs (odd-numbered 511 through 525) which are connected in a series-parallel arrangement with load 527. The value of the load is $Z_0/2$ which is equal to the characteristic impedance of any one of the stubs divided by 2. In FIGURE 5 the term $m$ used in the above equations is equal to 2, and the term $n$ used in these equations is equal to 3. Substituting these values in the equations above it is apparent that $k$ equals $m/1+n$ or $\frac{1}{2}$. Therefore the voltage across the load 527 is equal to $V_0/4$. If the equivalent circuit shown in FIGURE 5 is analyzed as shown in FIGURE 6 and the load voltage is determined it will be found to also equal $V_0/4$ thereby verifying the determination. It should also be noted that if the values for FIGURE 5 are substituted in Equation 5 the following is true:

$$1/8V_0+(2\times3)1/8V_0+(2-1)7/8V_0=0$$
$$1/8V_0+6/8V_0-7/8V_0=0$$

It becomes clear then that the circuits, shown in FIGURES 1 and 5, described above, each is a network arrangement of transmission lines which reduces the inherent delay of the signal of the transmission lines to a maximum of $2t$ and a minimum of $t$, wherein $t$ is the time required for an energy wave to transverse a transmission line stub of the network. These transmission line stubs, of course, can be fabricated to be relatively short in length to reduce the time $t$ thereby reducing the read-out time of the whole network. The output signal is somewhat attenuated but obviously by means of an amplifier, as a load, the signal output can be increased to a greater value. It becomes further apparent that the above described network provides a high speed read out means which employs transmission lines and which requires only one amplifier.

While I have described above the principles of my invention in connection with specific apparatus, it is to be clearly understood that this description is made only by way of example and not as a limitation to the scope of my invention as set forth in the objects thereof and in the accompanying claims.

The embodiments of the invention in which an exclusive property or privilege is claimed are defined as follows:

1. A signal sense line arrangement for a memory of magnetizable elements comprising:
(a) a plurality of transmission line stubs representing a sense line, each of said stubs having a substantially identical characteristic impedance;
(b) said transmission line stubs arranged in at least first and second groups;
(c) said transmission line stubs in said first group connected in series;
(d) a said transmission line stubs in said second group connected in series;
(e) said first and second groups connected in parallel with each other; and
(f) load means having a value which has a predetermined relationship to the value of said characteristic impedance which is common for each stub, said load connected in parallel with said first and second groups.

2. A signal sense line arrangement for a memory of magnetizable elements comprising:
(a) a plurality of transmission line stubs representing a sense line, each of said stubs having a substantially identical characteristic impedance Z;
(b) said transmission line stubs arranged in $n+1$ groups, where $n$ is equal to one less than the total number of groups;
(c) each of said groups having $m$ transmission line stubs connected in series;
(d) each of said groups connected in parallel with every other of said groups;
(e) load means having a value which is equal to $(m/n+1)$ $Z$, said load means being connected in parallel with said groups of transmission line stubs.

3. A signal sense line arrangement for a memory of magnetizable elements comprising:
(a) an even number of transmission line stubs representing a sense line, each of said stubs having a substantially identical characteristic impedance;
(b) one half of said transmission line stubs being connected together serially and the other half of said transmission line stubs being connected together serially;
(c) said first group of serially connected transmission line stubs being connected in parallel with said second group of said serially connected transmission line stubs; and
(d) load means equal to twice the characteristic impedance of any one of said transmission line stubs and connected in parallel with said first and second groups of transmission line stubs.

4. A signal sense line arrangement for a memory of magnetizable, elements comprising:
(a) a plurality of transmission line stubs representing a sense line, each of said stubs having a substantially identical characteristic impedance;
(b) said plurality of transmission line stubs being divided into four groups;
(c) each of said transmission line stubs in each of said groups being serially connected with said stubs of its associated group;
(d) each of said transmission line groups being parallel connected to each of the other of said groups; and
(e) load means being equal to one half the characteristic impedance of said transmission lines and connected in parallel to each of said groups.

5. A signal sense line network to be used with a memory of magnetizable elements comprising:
(a) a plurality of transmission line stubs each being associated with a number of magnetic elements to read data therefrom, each of said transmission line stubs having a substantially identical impedance Z;
(b) each of said transmission line stubs having substantially the same length such that a signal generated at one end of any one of said transmission line stubs requires $t$ time to reach the other end of said transmission line stub;
(c) said transmission line stubs arranged in $n+1$ groups, where $n$ is equal to one less than the total number of groups;
(d) each of said groups having $m$ transmission line stubs connected in series;
(e) each of said groups connected in parallel with every other of said groups;
(f) load means having a value which is equal to $(m/n+1)$ $Z$, said load means being connected in parallel with said groups of transmission line stubs and said network delaying a signal from the point of generation to said load means a maximum of $2t$ time and a minimum of $t$ time.

No references cited.

JAMES W. MOFFITT, *Acting Primary Examiner.*

G. LIEBERSTEIN, *Assistant Examiner.*